(12) United States Patent
Kato et al.

(10) Patent No.: US 7,719,821 B2
(45) Date of Patent: May 18, 2010

(54) ELECTRIC DOUBLE LAYER CAPACITOR

(75) Inventors: Kikuko Kato, Hirakata (JP); Sachi Niki, Hirakata (JP); Hiroshi Nonoue, Hirakata (JP)

(73) Assignee: SANYO Electric Co., Ltd., Moriguchi (JP)

( * ) Notice: Subject to any disclaimer, the term of this patent is extended or adjusted under 35 U.S.C. 154(b) by 625 days.

(21) Appl. No.: 11/712,297

(22) Filed: Feb. 28, 2007

(65) Prior Publication Data

US 2007/0253141 A1 Nov. 1, 2007

(30) Foreign Application Priority Data

Mar. 31, 2006 (JP) .............................. 2006-097091

(51) Int. Cl.
*H01G 9/00* (2006.01)

(52) U.S. Cl. ..................... 361/502; 361/503; 361/504; 361/508; 361/525

(58) Field of Classification Search ................. 361/502, 361/503–504, 508–512, 516–519, 523, 525, 361/528–541; 29/25.01, 25.03
See application file for complete search history.

(56) References Cited

U.S. PATENT DOCUMENTS 5,733,661 A * 3/1998 Ue et al. ..................... 428/426
6,181,545 B1 * 1/2001 Amatucci et al. ........... 361/502
6,288,890 B1 * 9/2001 Saito et al. .................. 361/523
6,912,116 B2 * 6/2005 Takahashi et al. ........... 361/502
7,050,291 B2 * 5/2006 Narendra et al. ............ 361/502
7,289,312 B2 * 10/2007 Duff, Jr. ..................... 361/502

FOREIGN PATENT DOCUMENTS

JP 2005-210064 4/2005

* cited by examiner

*Primary Examiner*—Nguyen T Ha
(74) *Attorney, Agent, or Firm*—Masuvalley & Partners

(57) ABSTRACT

The present invention provides an electric double layer capacitor. An electric double layer capacitor element sandwiches a separator between a cathode and an anode, arranged inside a container comprising a concave shaped containing portion and lid. A first conductive layer on the inner bottom face of a containing portion is covered by an insulating layer, and opening portions formed on the insulating layer penetrate to the first conductive layer. A second conductive layer is formed on the insulating layer and inside the opening portions, and is connected to a cathode through a conductive adhesive. The first conductive layer penetrates through the side wall of the containing portion, and is connected to a connecting terminal. An anode is connected to a third conductive layer through a conductive adhesive, and a collector is connected to a connecting terminal by extending between the containing portion and the lid.

9 Claims, 3 Drawing Sheets

Prior Art

ELECTRIC DOUBLE LAYER CAPACITOR

TECHNICAL FIELD

The present invention relates to an electric double layer capacitor.

BACKGROUND OF INVENTION

Conventionally, an electric double layer capacitor has been proposed, the electric double layer capacitor is mountable on the surface of a printed wiring board of a mobile phone and so on. An example of such technology is described in the Japanese published unexamined patent application no. 2005-210064.

FIG. 3 is a cross-section diagram to explain the configuration of a conventional electric double layer capacitor. The conventional electric double layer capacitor is hereafter explained in reference to FIG. 3.

In the conventional electric double layer capacitor, as shown in FIG. 3, an electric double layer capacitor element 102, which sandwiches a separator 102c between a cathode 102a and an anode 102b, is arranged inside a sealed container 101 comprising a lid 101a and a concaved containing portion 101b comprised of ceramics, such as alumina.

On the inner bottom face of the containing portion 101b, a first conductive layer 103 comprised of tungsten is formed, and a insulating layer 104 comprised of ceramics, such as alumina, is further formed and covers the first conductive layer 103. On the insulating layer 104, an opening portion 104a, which reaches from the surface of insulating layer 104 to the first conductive layer 103, is formed, and a second conductive layer 105 comprised of a valve metal, such as aluminum, or a carbon is formed on the first conductive layer 103 inside the opening portion 104a. A conductive adhesive 106 is formed on the insulating layer 104 and the second conductive layer 105, and a cathode 102a is connected to the second conductive layer 105 through the conductive adhesive 106. Also, the first conductive layer 103 penetrates through the side wall of the containing portion 101b, and is connected to a connecting terminal 107 that reaches from the side face to the lower face of the containing portion 101b.

A conductive adhesive 108 is formed on the anode 102b, and the anode 102b is connected to a third conductive layer 109 comprised of gold and nickel formed on the lower face of anode 102b and lid 101a through the conductive adhesive 108. Also, the third conductive layer 109 extends between the lid 101a and the container portion 101b, and is connected to a connecting terminal 110 that reaches from the side face to the lower face of the containing portion 101b.

Also, the inside of container 101 is filled with electrolytic solution (not shown) to sufficiently impregnate the cathode 102a and anode 102b. In this way, the conventional electric double layer capacitor is configured.

In the conventional electric double layer capacitor, the first conductive layer 103 comprised of tungsten is likely to undergo an anode corrosion, thus the first conductive layer 103 is coated with the insulating layer 104 comprised of ceramic to inhibit the corrosion. Also, by filling the second conductive layer 105 that connects the first conductive layer 103 with the cathode 102a inside the opening portion 104a of insulating layer 104, the first conductive layer 103 is not exposed to the electrolytic solution. Further, in the conventional electric double layer capacitor, the second conductive layer 105 is comprised of a valve metal, such as aluminum, or a carbon which are anode corrosion inhibiting. Consequently, in the conventional electric double layer capacitor, the second conductive layer 105 and the first conductive layer 103 are hard to dissolve even when a high voltage of approximately 3V is applied to the cathode.

However, in the conventional electric double layer capacitor described above, there are problems of a separation between the first conductive layer 103 and the second conductive layer 105 when heated by processes, such as reflow soldering. In this case, there is an issue of an increase in internal resistance for the conventional electric double layer capacitor described above.

The present invention is made to solve issues as described above, and one of the objectives for the present invention is to provide for an electric double layer capacitor whose internal resistance is less likely to increase.

BRIEF SUMMARY OF THE INVENTION

In order to achieve the above objective, a first invention provided with a container having a lid and a containing portion comprised of an insulating property material, an electric double layer capacitor element having a first electrode and a second electrode arranged to face each other in the container through a separator, an electrolytic solution filled in the container, wherein the containing portion includes a first conductive layer formed on the inner face of the containing portion, an insulating layer formed to cover the first conductive layer, a first opening portion and a second opening portion reaching from the surface of the insulating layer to the first conductive layer, and a second conductive layer formed on the first conductive layer within the first opening portion and the second opening portion, wherein the first electrode and the second conductive layer are electrically connected.

In this electric double layer capacitor, the first conductive layer and the first electrode are electrically connected in a plurality of paths through the second conductive layer within the first opening portion and the second opening portion formed on the insulating layer. This maintains the electric connection when, for example, connection at one opening portion is maintained even if disconnection or connection failure occurred at another opening portion due to a separation of the first conducive layer and the second conductive layer, thus failures in electric connecting paths between the first conductive layer and the first electrode can be inhibited. As a result, an electric double layer capacitor which can inhibit an increase of internal resistance can be obtained.

In addition, the first invention, preferably has a plurality of opening portions that connect the first conductive layer and the second conductive layer (besides the first opening portion and the second opening portion). By configuring this way, disconnection and connection failures between the first conductive layer and the first electrode can further be inhibited.

In addition, the minimum value of opening widths for the first opening portion and the second opening portion described above may be formed larger than 50 μm. By configuring this way, a sufficient contact area for a first metal layer and a second metal layer can be taken. Also, less contact failures occur in production, thus, the decrease of yield in production can be inhibited.

Further, (Δβ×L2), the product of differences of each linear coefficient of expansion for the first conducive layer and second conductive layer, Δβ, and the maximum value of opening widths for the first opening portion and the second opening portion, L2, may be 0.0039 μm/° C. or below. In addition, in the first invention, an average between approximately 0° C. and approximately 100° C. is used as a liner coefficient of expansion. By configuring this way, distortion in each opening portion due to thermal expansion of the first conductive layer and the second conductive layer from heating, such as solder reflow processes, can be reduced. This inhibits the separation of the first conductive layer and the second conductive layer within each opening portion. In addition, when the second conductive layer has a laminated structure comprising a plurality of metal materials, it is preferable to satisfy the above-mentioned relationship between the first conductive layer within each opening portion and its adjacent layers, and it is further preferable to satisfy the above-mentioned relationship between each adjacent layer.

Also, a second invention includes a container having a lid and a containing portion comprised of insulating property material, an electric double layer capacitor element having a first electrode and a second electrode arranged to face each other in the container through a separator, an electrolytic solution filled in the container, a first conductive layer formed in the inner face of the containing portion, an insulating layer formed to cover the first conducting layer, a plurality of opening portions reaching from the surface of the insulating layer to the first conductive layer, second conductive layers formed on each of the first conductive layer within the plurality of opening portions, wherein the first electrode and the second conducting layer are electrically connected.

In addition, the minimum value of opening widths for the plurality of opening portions described above may be formed larger than 50 μm. Further, ($\Delta\beta \times L2$), the product of differences of each linear coefficient of expansion for the first conducive layer and second conductive layer, $\Delta\beta$, and the maximum value of the opening width for each opening portion, L2, may be 0.0039 μm/° C. or below. This is based on the similar effect as the first invention described above.

Further, a third invention includes a container having a lid and a containing portion comprised of insulating property material, an electric double layer capacitor element having a first electrode and a second electrode arranged to face each other in the container through a separator, an electrolytic solution filled in the container, a first conductive layer formed in the inner face of the containing portion, an insulating layer formed to cover the first conductive layer, first to fourth opening portions reaching from the surface of the insulating layer to the first conductive layer, and second conductive layers formed on each of the first conductive layer within the first to the fourth opening portions, wherein the first electrode and the second conductive layer are electrically connected.

Also in the third invention, the minimum value of opening widths for the first to the fourth opening portions may be formed larger than 50 μm. Further, ($\Delta\beta \times L2$), the product of differences of each linear coefficient of expansion for the first conducive layer and second conductive layer, $\Delta\beta$, and maximum value of opening widths for the first to the fourth opening portions, L2, may be 0.0039 μm/° C. or below. This is based on the similar effect as the first invention described above.

DETAILED DESCRIPTION OF THE INVENTION

Embodiments of the present invention are hereinafter explained in reference to the figures.

Embodiment 1

Figure 1:
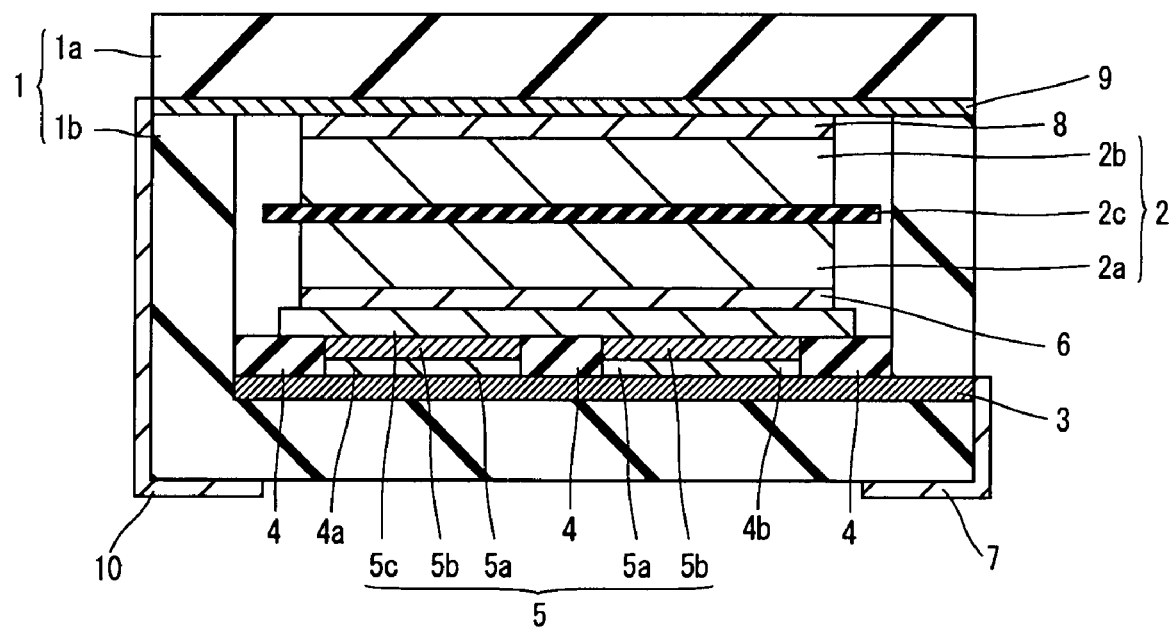
FIG. 1 is a cross-sectional diagram to explain the configuration of an electric double layer capacitor according to embodiment 1 of the present invention.
Figure 2:
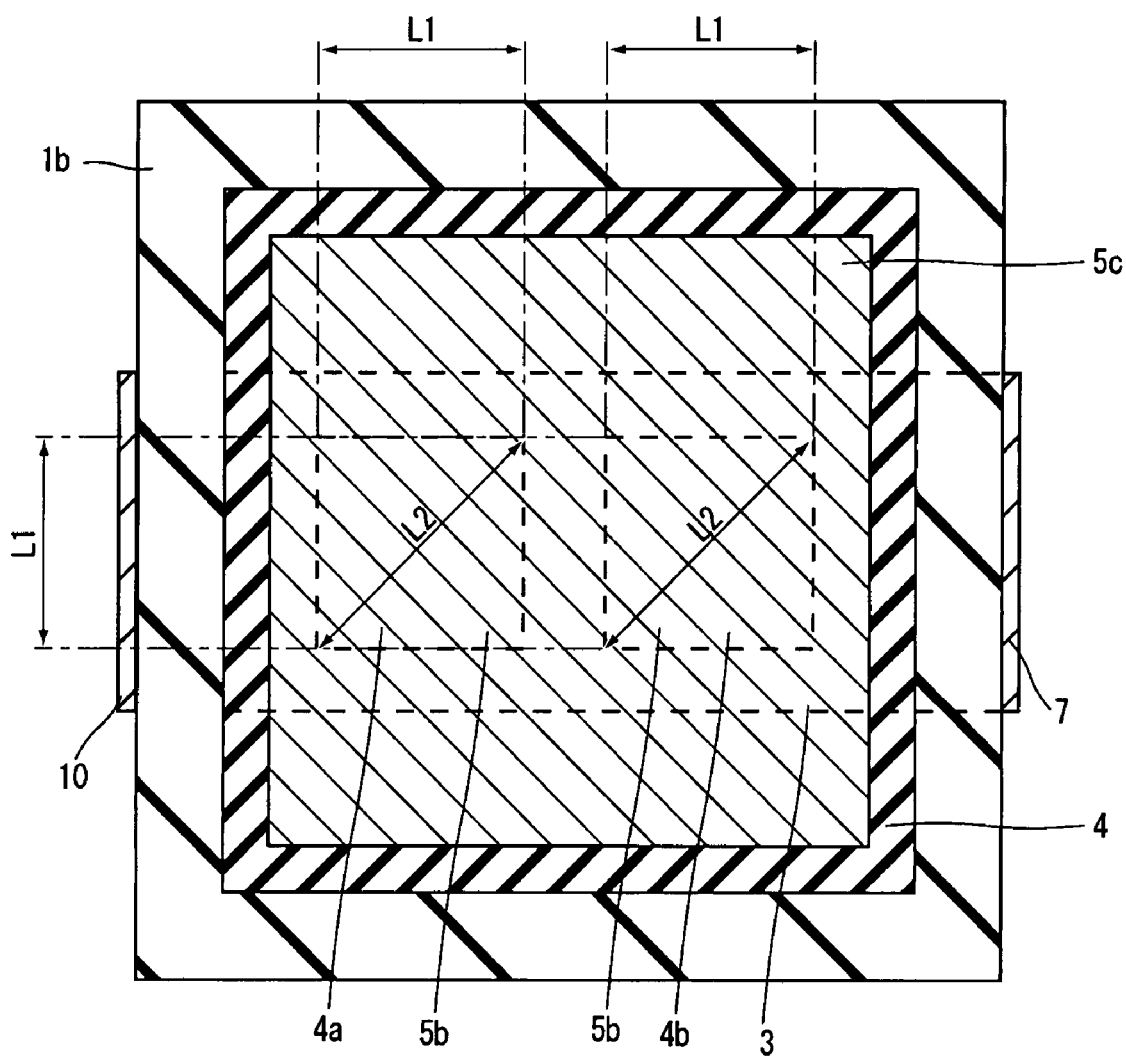
FIG. 2 is an upper view of a container portion in concaved form for an electric double layer capacitor according to embodiment 1 of the present invention.
Figure 3:
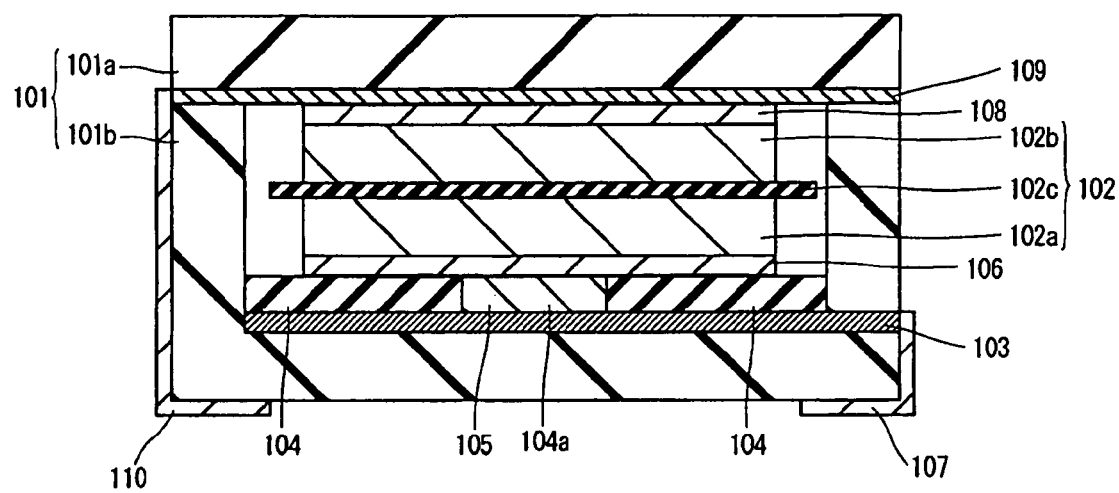
FIG. 3 is a cross-section diagram to explain the configuration of a conventional electric double layer capacitor.

FIG. 1 is a cross-sectional diagram to explain the configuration of an electric double layer capacitor according to embodiment 1 of the present invention. FIG. 2 is an upper view of a container portion in concaved form for an electric double layer capacitor according to embodiment 1 of the present invention. The configuration of the electric double layer capacitor according to embodiment 1 of the present invention is hereinafter explained in reference to FIGS. 1 and 2.

In the electric double layer capacitor of the embodiment 1 of the present invention, as shown in FIG. 1, an electric double layer capacitor element 2 sandwiches a separator 2c comprised of glass fiber between a cathode 2a and an anode 2b, and is arranged inside a container 1 having a lid 1a comprised of kovar (which is comprised of cobalt: approximately 17 wt %, nickel: approximately 29 wt %, the rest: iron) and a containing portion 1b in a concaved form comprised of alumina. In addition, the cathode 2a and the anode 2b are examples of a "first electrode" and a "second electrode" of the present invention respectively.

The container 1 is in a rectangular solid shape with approximately 5 mm on a side and approximately a 1.5 mm height, and a concave portion with approximately 3.5 mm on a side and approximately a 1.0 mm depth is formed on the containing portion 1b. The containing portion 1b is formed by firing a compact in which are layered a plurality of ceramic green sheets (comprising an unburned ceramic material in a sheet form) having a thickness of approximately 0.5 mm.

Each of the cathode 2a and the anode 2b has a size of approximately 3.3 mm square by approximately 0.5 mm, and are comprised of activated carbon powder combined approximately 10 wt % of acetylene black and approximately 10 wt % of polytetrafluoroethylene. The specific surface of the activated carbon powder is approximately 2000 m²/g.

Also, referring to FIG. 2, a first metal layer 3 comprised of tungsten having a width of approximately 800 μm is formed on the inner bottom face of the containing portion 1b, and a insulating layer 4 comprised of alumina having a thickness of approximately 10 μm is further formed to cover the first metal layer 3. The conductive layer 3 is formed by firing the green sheet applied with a tungsten paste simultaneously with the above mentioned ceramic green sheets while forming the containing portion 1b. On the insulating layer 4, a first opening portion 4a and a second opening portion 4b in square shapes of approximately 500 μm on a side, which penetrate through the insulating layer 4 to the first conductive layer 3, are formed symmetrically to the center of the inner bottom face of the container portion 1b, wherein each of minimum opening width (L1) is approximately 500 μm and maximum opening width (L2) is approximately 707 μm. In addition, the insulating layer 4, the first opening portion 4a and the second opening portion 4b are formed by applying an alumina paste, covering the first conductive layer 3 on the inner bottom face of the containing portion, leaving the opening portions 4a and 4b above uncovered, and firing the paste.

Onto the insulating layer 4 and the first conductive layer 3 within the first opening portion 4a and the second opening portion 4b, a second conductive layer 5 having a 3-layer structure is formed. The second conductive layer 5 comprises a first layer 5a comprised of nickel in a thickness of approximately 10 μm formed to fill inside the first opening portion 4a and the second opening portion 4b, a second layer 5b comprised of gold formed on the first layer 5a in a thickness of approximately 0.5 μm, and a third layer 5c comprised of gold formed on the insulating layer 4 and the second layer 5b in a thickness of approximately 1 μm. Each of the first layer 5a and the second layer 5b is formed by plating, and the third layer 5c is formed by the spattering method.

On the second conducting layer 5, a conductive adhesive 6 comprised of carbon powder and organic binder is applied and formed, thereby the cathode 2a and the second conductive layer 5 are connected through the conductive adhesive 6. In addition, the third layer 5c and the conductive adhesive 6 have a larger area than the cathode 2a in order to contact with the whole area of cathode 2a.

Also, the first conductive layer 3 penetrates through the side wall of the containing portion 1b and is connected to the connecting terminal 7 formed across from the side face to the lower face of the containing portion 1b. The connecting terminal 7 has a laminated structure on the containing portion 1b in the order of a tungsten layer in a thickness of approximately 15 μm, a nickel layer in a thickness of approximately 10 μm, and a gold layer in a thickness of approximately 0.5 μm.

On the anode 2b, a conductive adhesive 8, comprised of carbon powder and organic binder, is applied and formed, and a third conductive layer 9 formed on the lower face of the lid 1a is connected to the anode 2b through the conductive adhesive 8. The third conductive layer 9 has a laminated structure comprised of a nickel layer in a thickness of approximately 10 μm, and a gold layer in a thickness of approximately 0.5 μm. Also, the third conductive layer 9 extends between the lid 1a and the containing portion 1b, and is connected to a connecting terminal 10 formed across from the side face to the lower face of the containing portion 1b. The connecting terminal 10 has a laminated structure on the containing portion 1b, comprised of a tungsten layer having a thickness of approximately 15 μm, a nickel layer having a thickness of approximately 10 μm, and a gold layer having a thickness of approximately 0.5 μm.

Also, the container 1 is filled with electrolytic solution (not shown) which is formed by dissolving $(C_2H_5)_4NBF_4$ in approximately 1 mol/liter concentration into a solvent, propylenecarbonate, to sufficiently soak the cathode 2a and the anode 2b. Also, the lid 1a and the container portion 1b are sealed by seam welding through a seal ring (not shown) formed on the edge portion of the open end of the container portion 1b. In this way, the electric double layer capacitor of the embodiment 1 is configured.

In the embodiment 1, the first conductive layer 3 and the cathode 2a are electrically connected in a plurality of paths through the second conductive layer 5 within the first opening portion 4a and the second opening portion 4b formed on the insulating layer 4. This maintains the electric connection when, for example, connection at one opening portion is maintained even if disconnection or connection failure occurs at another opening portion due to a separation of the first conducive layer 3 and the second conductive layer 5. Thus, failures in electric connecting paths between the first conductive layer 3 and the cathode 2a can be inhibited, thereby an electric double layer capacitor which inhibits an increase of internal resistance can be obtained.

Also in the embodiment 1, since the minimum value (L1) of opening widths for the first opening portion 4a and the second opening portion 4b is larger than 50 μm, a sufficient contact area for the first conductive layer 3 and the second conductive layer 5 can be taken. Also, less contact failures occur in production, thus, the decrease of yield in production can be inhibited.

In addition, in the embodiment 1, since the first conductive layer 3 is comprised of tungsten and the second conductive layer 5 has a laminated structure of nickel and gold, the difference in the linear coefficient of expansion between the each adjacent layer is maximum ($\Delta\beta$=approximately $9.2\times10^{-6}/°$ C.) between the tungsten of the first conductive layer 3 and the nickel of the first layer 5a. And, in the embodiment 1, ($\Delta\beta\times L2$), the product of above $\Delta\beta$ and the maximum value of opening widths for the first opening portion 4a and the second opening portion 4b, L2, is 0.007 μm/° C.

COMPARATIVE EXAMPLE 1

As an comparative example 1, an electric double layer capacitor which has a similar structure to that of embodiment 1 was fabricated, except that only one opening portion is formed on the insulating layer 4 on the inner bottom face of the containing portion 1a.

A storage test for approximately 10 minutes at approximately 260° C. has been conducted on 20 cells each of electric double layer capacitor fabricated for the embodiment 1 and the comparative example 1. Thereafter, for each cell, internal resistances were measured at a frequency of approximately 1 kHz with a ohm tester to determine the ratio of degraded cells showing a value of 1000 Ohm or above. The results are shown in table 1.

TABLE 1

| | Number of opening portion(s) | Ratio of degraded cells % |
|---|---|---|
| Embodiment 1 | 2 | 60 |
| Comparative example 1 | 1 | 90 |

As shown in table 1, the ratio of degraded cells for the electric double layer capacitors of embodiment 1 is smaller compared to the comparative example 1. Based on this, it can be said that providing the insulating layer 4 with a plurality of opening portions is effective for inhibiting the increase of internal resistance of an electric double layer capacitor.

COMPARATIVE EXAMPLES 2-6

For each comparative example, twenty cells of electric double layer capacitor, which have similar construction to that of comparative example 1 except that the shape of the opening potion was changed, were fabricated as described below.

The electric double layer capacitor of comparative example 2 was configured similar to that of comparative example 1, except that an opening portion is formed in a square shape of approximately 50 μm on the insulating layer. At this time, the minimum opening width of the opening portion, L1, is approximately 50 μm and the maximum opening width, L2, is approximately 70.7 μm. Also, the relationship of the linear coefficient of expansion between the first conductive layer 3 and the second conductive layer 5 is similar to that of comparative example 1, thus, ($\Delta\beta\times L2$), the product of differences of the linear coefficient of expansion ($\Delta\beta$=approximately $9.2\times10^{-6}/°$ C.) and L2 was 0.0007 μm/° C.

The electric double layer capacitor of comparative example 3 was configured similar to that of comparative example 1, except that an opening portion is formed in a square shape of approximately 75 μm on the insulating layer. At this time, the minimum opening width of the opening portion, L1, is approximately 75 μm and the maximum opening width, L2, is approximately 106 μm. Also, (Δβ×L2) is approximately 0.0010 μm/° C.

The electric double layer capacitor of comparative example 4 was configured similar to that of comparative example 1, except that an opening portion is formed in a square shape of approximately 150 μm on the insulating layer. At this time, the minimum opening width of the opening portion, L1, is approximately 150 μm and the maximum opening width, L2, is approximately 212 μm. Also, (Δβ×L2) is approximately 0.0020 μm/° C.

The electric double layer capacitor of comparative example 5 was configured similar to that of comparative example 1, except that an opening portion is formed in a square shape of approximately 200 μm on the insulating layer. At this time, the minimum opening width of the opening portion, L1, is approximately 200 μm and the maximum opening width, L2, is approximately 283 μm. Also, (Δβ×L2) is approximately 0.0026 μm/° C.

The electric double layer capacitor of comparative example 6 was configured similar to that of comparative example 1, except that an opening portion is formed in a square shape of approximately 300 μm on the insulating layer. At this time, the minimum opening width of the opening portion, L1, is approximately 300 μm and the maximum opening width, L2, is approximately 424 μm. Also, (Δβ×L2) is approximately 0.0039 μm/° C.

Embodiment 2

As an embodiment 2, 20 cells of electric double layer capacitor which have similar constructions to that of embodiment 1 were fabricated, except that both of opening portions 4a and 4b were formed in square shapes of approximately 150 μm as described above, in comparative example 1. At this time, the minimum opening width of the opening portion, L1, is approximately 150 μm and the maximum opening width, L2, is approximately 212 μm. Also, (Δβ×L2) is approximately 0.0020 μm/° C.

Next, a storage test for approximately 10 minutes at approximately 260° C. was conducted on 20 cells of each of the electric double layer capacitors fabricated for the comparative example 2-6 and embodiment 2. Thereafter, for each cell, internal resistances were measured at a frequency of approximately 1 kHz with an ohm tester to determine the ratio of degraded cells showing a value of 1000 Ohm or above. The results are shown in table 2.

TABLE 2

| | Number of opening portions | L1 μm | Δβ × L2 μm/° C. | Ratio of degraded cells % |
|---|---|---|---|---|
| Comparative example 2 | 1 | 50 | 0.0007 | 95 |
| Comparative example 3 | 1 | 75 | 0.0010 | 45 |
| Comparative example 4 | 1 | 150 | 0.0020 | 20 |
| Comparative example 5 | 1 | 200 | 0.0026 | 30 |
| Comparative example 6 | 1 | 300 | 0.0039 | 50 |
| Embodiment 2 | 2 | 150 | 0.0020 | 5 |
| Embodiment 1 | 2 | 500 | 0.0070 | 60 |

TABLE 2-continued

| | Number of opening portions | L1 μm | Δβ × L2 μm/° C. | Ratio of degraded cells % |
|---|---|---|---|---|
| Comparative example 1 | 1 | 500 | 0.0070 | 90 |

As shown in table 2, the ratio of degraded cells for embodiments 1 and 1 with two opening portions are smaller compared to other comparative examples.

Also, in comparative example 2, it became apparent that the minimum width of the opening portion, L1, is small as approximately 50 μm, thus the first conductive layer and the second conductive layer are not able to contact sufficiently. Based on this, it can be said that it is preferable for the minimum opening width of a opening portion, L1, to be 50 μm or larger.

Further, by comparing each comparative example except for the embodiment 2, it can be pointed out that there is the tendency that the ratio of degraded cells increases as the value of (Δβ×L2) increase more than approximately 0.0039 μm/° C., the value of (Δβ×L2) in the case of the comparative example 6, whose ratio of degraded cells is 50%. Based on this, it can be said that it is preferable for the value of (Δβ×L2) to be approximately 0.0039 μm/° C. or below.

In addition, the embodiments disclosed herein should be considered as examples in all respects, not as limitations. The scope of the present invention is indicated by the scope of the claims, not by the explanation of embodiments described above, and further, any meanings equivalent to the scope of the claims and all changes within the scope are included.

For example, in the embodiment described above, the number of the opening portions are 2, however, this invention is not limited to this and more opening portions may be provided.

Specifically, an embodiment with four opening portions is explained as embodiment 3. As described above, with the larger number of opening portions, the probability for maintaining an electric connection with the external terminal increases. For this reason, it is required in a design to provide as many opening portions within the size of container 1 predetermined by the design.

Contrarily, however, in order to increase the number of opening portions on the container 1 in the size that is determined by design, the size of a opening portion itself needs to be small. For example, the container 1 with an outer diameter of 3.7 mm square and an inner diameter 2.9 mm square is used for embodiment 3, the preferable number of opening portions is determined to be four in light of the processing precision for an alumina coat.

That is, if the size of the opening portion is too small, processing error occurs in the coating, thereby deteriorating the yield. For this reason, the probability for maintaining an electric connection with the outer terminal needs to be improved within a range that no processing error occurs.

Under such conflicting factors, four opening portions are determined to be preferable for the container 1 of embodiment 3 in light of the yield and maintaining the electric connection.

In addition, the number of opening portions may be six or more in case of future improvement of the processing precision, and the present invention discloses a double layer capacitor with a plurality of opening portions. For this reason, techniques such as the minimum opening width (L1) and the maximum opening width (L2) explained in embodiment 1 are applied to this embodiment 3.

Further, in the embodiments described above, the shape of the opening portion is a square, however, the present invention is not limited to this and the opening portions may be in a polygonal shape, such as a rectangle, a circular shape, or ellipse shape.

Further, in the embodiments described above, two opening portions are in the same shape, however, the present invention is not limited to this and each of them may be in a different shape.

Further, in the embodiment described above, the second conductive layer 5 is in a laminated structure of first layer 5a, second layer 5b, and third layer 5c, however, this invention is not limited to this and layer 5 may be a single layer, or more layers.

Further, in the embodiments described above, the first layer 5a is comprised of nickel, however, the present invention is not limited to this and layer 5a may be comprised of a material with larger linear coefficient of expansion, such as tin, or a material with a smaller linear coefficient of expansion, such as cobalt.

Still further, in the embodiments described above, the insulating layer is formed by firing alumina paste, however, the present invention is not limited to this and the insulating layer may be formed simultaneously with the containing portion 1b. That is, it may be formed by forming beforehand a ceramic green sheet with the first opening portion 4a and the second opening portion 4b arranged on the inner bottom face of the containing portion 1b, and firing this.

What is claimed is:

1. An electric double layer capacitor comprising;
a container having a lid and a containing portion comprised of an insulating material,
an electric double layer capacitor element having a first electrode and a second electrode arranged to face each other inside of said container through a separator; and
an electrolytic solution located in said containing portion;
wherein said containing portion comprises;
a first conductive layer formed on an inner face of said containing portion;
an insulating layer formed to cover said first conductive layer;
a first opening portion and a second opening portion that reach from a surface of said insulating layer to said first conductive layer; and
a second conductive layer formed on said first conductive layer within said first opening portion and the second opening portion;
wherein said first electrode and said second conductive layer are electrically connected.

2. The electric double layer capacitor according claim 1, wherein a minimum value of opening widths for said first opening portion and said second opening portion is larger than 50 µm.

3. The electric double layer capacitor according claim 1 or 2, wherein ($\Delta\beta \times L2$), a product of a difference of each linear coefficient of expansion for said first conducive layer and said second conductive layer, $\Delta\beta$, and a maximum value of opening widths for said first opening portion and said second opening portion, L2, is 0.0039 µm/° C. or below.

4. An electric double layer capacitor comprising;
a container having a lid and a containing portion comprised of an insulating material,
an electric double layer capacitor element having a first electrode and a second electrode arranged to face each other inside of said container through a separator;
an electrolytic solution located in said containing portion;
a first conductive layer formed on an inner face of said containing portion;
an insulating layer formed to cover said first conductive layer;
a plurality of opening portions that reach from a surface of said insulating layer to said first conductive layer; and
a second conductive layer formed on said first conductive layer within said plurality of opening portions;
wherein said first electrode and said second conductive layer are electrically connected.

5. The electric double layer capacitor according claim 4, wherein a minimum value of opening widths for said plurality of opening portions is larger than 50 µm.

6. The electric double layer capacitor according claim 4 or 5, wherein ($\Delta\beta \times L2$), a product of a difference of each linear coefficient of expansion for said first conducive layer and said second conductive layer, $\Delta\beta$, and a maximum value of opening widths for said plurality of opening portions, L2, is 0.0039 µm/° C. or below.

7. An electric double layer capacitor comprising;
a container having a lid and a containing portion comprised of an insulating material,
an electric double layer capacitor element having a first electrode and a second electrode arranged to face each other inside of said container through a separator;
an electrolytic solution located in said containing portion;
a first conductive layer formed on an inner face of said containing portion;
an insulating layer formed to cover said first conductive layer;
a group comprising four opening portions that each reach from a surface of said insulating layer to said first conductive layer; and
second conductive layers formed on said first conductive layer within said group of four opening portions;
wherein said first electrode and said second conductive layer are electrically connected.

8. The electric double layer capacitor according claim 7, wherein a minimum value of opening widths for each of said group of four opening portions is larger than 50 µm.

9. The electric double layer capacitor according claim 7 or 8, wherein ($\Delta\beta \times L2$), a product of a difference of each linear coefficient of expansion for said first conducive layer and said second conductive layer, $\Delta\beta$, and a maximum value of opening widths for each of said group of four opening portions, L2, is 0.0039 µm/° C. or below.

* * * * *